United States Patent
Saitoh et al.

(10) Patent No.: US 10,890,092 B2
(45) Date of Patent: Jan. 12, 2021

(54) INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota (JP)

(72) Inventors: Hirotaka Saitoh, Mishima (JP); Hiromasa Nishioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 254 days.

(21) Appl. No.: 15/892,580

(22) Filed: Feb. 9, 2018

(65) Prior Publication Data
US 2018/0230879 A1    Aug. 16, 2018

(30) Foreign Application Priority Data
Feb. 10, 2017   (JP) ................ 2017-022931

(51) Int. Cl.
*F01N 3/20* (2006.01)
*F01N 11/00* (2006.01)
*B01D 53/94* (2006.01)

(52) U.S. Cl.
CPC ......... *F01N 3/208* (2013.01); *B01D 53/9418* (2013.01); *B01D 53/9495* (2013.01); *F01N 3/2066* (2013.01); *F01N 11/00* (2013.01); *F01N 11/002* (2013.01); *F01N 11/007* (2013.01); *F01N 2550/02* (2013.01);
(Continued)

(58) Field of Classification Search
CPC . B01D 53/9418; B01D 53/9495; F01N 11/00; F01N 11/002; F01N 11/007; F01N 2550/02; F01N 2560/06; F01N 2610/02; F01N 2610/04; F01N 2900/1602;
(Continued)

(56) References Cited

U.S. PATENT DOCUMENTS

| 6,951,100 B2 | 10/2005 | Kuboshima et al. |
| 2004/0098974 A1 * | 5/2004 | Nieuwstadt ........ B01D 53/9431 60/286 |

(Continued)

FOREIGN PATENT DOCUMENTS

| CN | 1717536 A | 1/2006 |
| CN | 101158306 A | 4/2008 |

(Continued)

*Primary Examiner* — Phutthiwat Wongwian
*Assistant Examiner* — Diem T Tran
(74) *Attorney, Agent, or Firm* — Finnegan, Henderson, Farabow, Garrett & Dunner, LLP (57) ABSTRACT

An internal combustion engine may include an electronic control unit configured to supply additives to an exhaust gas cleaning catalyst having a temperature not more than a predetermined temperature. The electronic control unit may execute abnormality diagnosis of the exhaust gas cleaning catalyst based on an ability for cleaning exhaust gas of the exhaust gas cleaning catalyst. When preforming abnormality diagnosis of the exhaust gas cleaning catalyst having the temperature not more than the predetermined temperature, the electronic control unit may reduce the amount of the additives supplied to the exhaust gas cleaning catalyst to less than the amount supplied when abnormality diagnosis of the exhaust gas cleaning catalyst having the temperature not more than the predetermined temperature is not executed.

10 Claims, 7 Drawing Sheets

(52) U.S. Cl.
CPC ...... *F01N 2560/06* (2013.01); *F01N 2610/02* (2013.01); *F01N 2610/04* (2013.01); *F01N 2900/1602* (2013.01); *Y02T 10/12* (2013.01); *Y02T 10/40* (2013.01)

(58) Field of Classification Search
CPC ........ F01N 3/2066; F01N 3/208; Y02T 10/24; Y02T 10/47
USPC ............................ 60/274, 277, 286, 295, 303
See application file for complete search history.

(56) References Cited

U.S. PATENT DOCUMENTS

| | | | | |
|---|---|---|---|---|
| 2007/0044457 | A1* | 3/2007 | Upadhyay | F01N 3/2026 60/295 |
| 2010/0043397 | A1* | 2/2010 | Wang | F01N 3/208 60/273 |
| 2010/0257844 | A1* | 10/2010 | Shimomura | F01N 3/208 60/277 |
| 2010/0319316 | A1* | 12/2010 | Kasahara | F01N 3/106 60/273 |
| 2016/0186628 | A1* | 6/2016 | Saitoh | F01N 3/0871 60/276 |
| 2016/0186638 | A1 | 6/2016 | Hagiwara et al. | |

FOREIGN PATENT DOCUMENTS

| | | |
|---|---|---|
| EP | 1 445 441 A1 | 8/2004 |
| JP | 2009-162159 | 7/2009 |
| JP | 2011-144055 | 7/2011 |
| JP | 2016-125391 | 7/2016 |
| JP | 2016-142206 | 8/2016 |
| WO | WO 2005/035952 A1 | 4/2005 |

\* cited by examiner

INTERNAL COMBUSTION ENGINE AND METHOD FOR CONTROLLING INTERNAL COMBUSTION ENGINE

CROSS-REFERENCE TO RELATED APPLICATIONS

This application is based on and claims the benefit of priority to Japanese Patent Application No. 2017-022931, filed on Feb. 10, 2017, which is incorporated herein by reference in its entirety.

BACKGROUND

1. Technical Field

The present disclosure relates to an internal combustion engine and a method for controlling an internal combustion engine.

2. Description of Related Art

It is known to implement a technique for supplying additives to an exhaust gas cleaning catalyst to improve an ability for cleaning exhaust gas. Hereinafter, treatment of supplying additives to an exhaust gas cleaning catalyst to improve its ability for cleaning exhaust gas is referred to as assist treatment. Additives such as, for example, hydrogen and ozone are known to be used for the assist treatment. When the assist treatment is executed, the ability for cleaning exhaust gas can be improved even if a low temperature in an exhaust gas cleaning catalyst causes low activity of the catalyst.

For example, it is known to implement a technique in which fuel is modified to generate a reducing gas containing hydrogen and carbon monoxide, and the reducing gas is supplied to an NOx catalyst to increase reductive reaction speed in the NOx catalyst, thereby improving an ability for removing NOx of the NOx catalyst, particularly at low temperature (e.g., refer to Japanese Patent Application Publication No. 2009-162159). It is also known to implement a technique of modifying fuel in a fuel-air mixture to generate hydrogen (e.g., refer to Japanese Patent Application Publication No. 2011-144055). In addition, it is known that ozone is supplied to improve NOx storage efficiency of an NOx catalyst at low temperature, and to improve an oxidation function of an oxidation catalyst (e.g., refer to Japanese Patent Application Publication No. 2016-142206).

In an On-board-diagnostics (OBD), when the ability for cleaning exhaust gas in an exhaust gas cleaning catalyst is detected by a sensor or the like to result in deterioration in the ability for cleaning exhaust gas, exceeding an allowable range, it is diagnosed that the exhaust gas cleaning catalyst is abnormal. For example, it is known that, when a three-way catalyst or a storage-reduction type NOx catalyst (NSR catalyst) is disposed in an exhaust passage upstream of a selective reduction type NOx catalyst (SCR catalyst) to change an air-fuel ratio of exhaust gas from a lean air-fuel ratio more than a theoretical air-fuel ratio to a rich air-fuel ratio less than the theoretical air-fuel ratio, accuracy of abnormality diagnosis is improved by causing a water gas shift reaction in the three-way catalyst or the NSR catalyst to enlarge a difference between a sensor output difference when the SCR catalyst is normal and that when the SCR catalyst is abnormal (e.g., refer to Japanese Patent Application Publication No. 2016-125391).

SUMMARY

Emission requirements in each country have become more stringent over time, and it is thus desirable to detect that an exhaust gas cleaning catalyst is abnormal in abnormality diagnosis of the exhaust gas cleaning catalyst even if a degree of deterioration is still low. Abnormality diagnosis of an exhaust gas cleaning catalyst may sometimes be executed during every trip of a vehicle. In such a case, abnormality diagnosis may be executed relatively early after an internal combustion engine is started to reliably execute the abnormality diagnosis. At this time, temperature of an exhaust gas cleaning catalyst is relatively low, so that assist treatment may be executed. Even when abnormality diagnosis of an exhaust gas cleaning catalyst is deteriorated to the extent of being detected as abnormal, executing assist treatment improves the ability for cleaning exhaust gas of the exhaust gas cleaning catalyst. This reduces a difference between the ability for cleaning exhaust gas when the exhaust gas cleaning catalyst is normal and when it is abnormal. When abnormality diagnosis of an exhaust gas cleaning catalyst is executed on the basis of ability for cleaning exhaust gas in such a case, a wrong diagnosis may be provided. That is, when assist treatment is applied to an exhaust gas cleaning catalyst having abnormality to improve its ability for cleaning exhaust gas, the exhaust gas cleaning catalyst may be wrongly diagnosed as normal in the abnormality diagnosis of the exhaust gas cleaning catalyst.

The present disclosure improves diagnosis accuracy by having abnormality diagnosis be executed when an exhaust gas cleaning catalyst has a low temperature.

A first aspect of the present disclosure is an internal combustion engine. The internal combustion engine may include: an exhaust gas cleaning catalyst that is provided in an exhaust passage to clean exhaust gas; a temperature detector that detects temperature of the exhaust gas cleaning catalyst; an additives-supply device that supplies additives to the exhaust gas cleaning catalyst; and an electronic control unit configured to cause the additives supply device to supply the additives to the exhaust gas cleaning catalyst when the temperature of the exhaust gas cleaning catalyst, detected by the temperature detector, is not more than a predetermined temperature. The electronic control unit may be configured to execute abnormality diagnosis of the exhaust gas cleaning catalyst based on an ability for cleaning exhaust gas of the exhaust gas cleaning catalyst. When executing abnormality diagnosis of the exhaust gas cleaning catalyst having the temperature not more than the predetermined temperature, the electronic control unit may be configured to reduce an amount of the additives supplied to the exhaust gas cleaning catalyst to less than an amount of the additives supplied when abnormality diagnosis of the exhaust gas cleaning catalyst having the temperature not more than the predetermined temperature is not executed.

Even if an exhaust gas cleaning catalyst has a low temperature, supplying additives to the exhaust gas cleaning catalyst enables cleaning ability of the exhaust gas cleaning catalyst to be improved. That is, when a sufficient amount of additives is supplied to an exhaust gas cleaning catalyst having the temperature not more than a predetermined temperature, cleaning ability of the exhaust gas cleaning catalyst can be sufficiently improved. In this case, the ability for cleaning exhaust gas can be sufficiently increased regardless of whether the exhaust gas cleaning catalyst is normal or abnormal. This reduces a difference between the ability for cleaning exhaust gas when the exhaust gas cleaning catalyst is normal and when the exhaust gas cleaning catalyst is abnormal. The predetermined temperature is an upper limit of a temperature, which cause change in the cleaning ability of the exhaust gas cleaning catalyst due to the amount of additives supplied to the exhaust gas cleaning catalyst.

With the above configuration, when abnormality diagnosis of an exhaust gas cleaning catalyst having the temperature not more than a predetermined temperature is executed, a supply amount of additives may be reduced to deteriorate the ability for cleaning exhaust gas. When a supply amount of additives is reduced, a degree of deterioration in the ability for cleaning exhaust gas when an exhaust gas cleaning catalyst is abnormal may increase to more than when it is normal. That is, reduction in a supply amount of additives when abnormality diagnosis is executed increases a difference between the ability for cleaning exhaust gas when an exhaust gas cleaning catalyst in normal and when it is abnormal. When abnormality diagnosis is executed in this kind of state, diagnosis accuracy can be improved.

In the internal combustion engine, the electronic control unit may be configured to increase an amount of the additives to be supplied to the exhaust gas cleaning catalyst from the time when abnormality diagnosis of the exhaust gas cleaning catalyst is completed, as compared to when abnormality diagnosis of the exhaust gas cleaning catalyst is executed.

With the above configuration, when a supply amount of additives is increased immediately after abnormality diagnosis is finished, the cleaning ability of an exhaust gas cleaning catalyst can be immediately improved.

In the internal combustion engine, the electronic control unit may be configured to execute abnormality diagnosis of the exhaust gas cleaning catalyst when the exhaust gas cleaning catalyst has a temperature that is the predetermined temperature or less and is a lower limit temperature or higher. The lower limit temperature may be a lower limit of a temperature, which causes a difference between the ability for cleaning exhaust gas when the exhaust gas cleaning catalyst is normal and when it is abnormal in the exhaust gas cleaning catalyst having the temperature less than the predetermined temperature.

When the temperature of the exhaust gas cleaning catalyst is too low, the cleaning ability of the exhaust gas cleaning catalyst is deteriorated even if it is normal. This reduces a difference between the cleaning ability of the exhaust gas cleaning catalyst when it is normal and when it is abnormal. Thus, accuracy of abnormality diagnosis may be deteriorated. With the above configuration, when abnormality diagnosis is executed at a lower limit temperature or higher and the lower limit temperature is a lower limit value of the temperature causing a difference between the ability for cleaning exhaust gas of an exhaust gas cleaning catalyst when it is normal and when it is abnormal, accuracy of the abnormality diagnosis can be improved.

In the internal combustion engine, the electronic control unit may be configured to execute abnormality diagnosis of the exhaust gas cleaning catalyst when the exhaust gas cleaning catalyst has a temperature that is the predetermined temperature or less and is closer to the lower limit temperature than to the predetermined temperature.

When the amount of additives is reduced, a lower temperature increases a difference between cleaning ability of an exhaust gas cleaning catalyst when it is normal and when it is abnormal. Thus, within a range from the lower limit temperature to the predetermined temperature, a difference between the cleaning ability of an exhaust gas cleaning catalyst when it is normal and when it is abnormal may increase more at the temperature closer to the lower limit temperature than to the predetermined temperature. With the above configuration; when abnormality diagnosis is executed at the temperature close to the lower limit temperature, accuracy of the abnormality diagnosis can be improved.

In the internal combustion engine, the electronic control unit may be configured to stop supply of the additives to the exhaust gas cleaning catalyst when abnormality diagnosis of the exhaust gas cleaning catalyst having a temperature not more than the predetermined temperature is executed.

A second aspect of the present disclosure is a method for controlling an internal combustion engine. The internal combustion engine may include: an exhaust gas cleaning catalyst that is provided in an exhaust passage to clean exhaust gas; a temperature detector that detects a temperature of the exhaust gas cleaning catalyst; an additives-supply device that supplies additives to the exhaust gas cleaning catalyst; and an electronic control unit configured to cause the additives supply device to supply the additives to the exhaust gas cleaning catalyst when the temperature of the exhaust gas cleaning catalyst, detected by the temperature detector, is not more than a predetermined temperature. The electronic control unit may be configured to execute abnormality diagnosis of the exhaust gas cleaning catalyst based on an ability for cleaning exhaust gas of the exhaust gas cleaning catalyst. The method for controlling an internal combustion engine may include reducing, by the electronic control unit, an amount of the additives supplied to the exhaust gas cleaning catalyst when abnormality diagnosis of the exhaust gas cleaning catalyst having a temperature not more than the predetermined temperature is executed, to less than an amount supplied when abnormality diagnosis of the exhaust gas cleaning catalyst having the temperature not more than the predetermined temperature is not executed.

With the above configuration, when abnormality diagnosis of an exhaust gas cleaning catalyst having the temperature not more than a predetermined temperature is executed, a supply amount of additives may be reduced to deteriorate the ability for cleaning exhaust gas. When a supply amount of additives is reduced, a degree of deterioration in the ability for cleaning exhaust gas when an exhaust gas cleaning catalyst is abnormal may increase to more than when it is normal. That is, reduction in a supply amount of additives when abnormality diagnosis is executed may increase a difference between the ability for cleaning exhaust gas when an exhaust gas cleaning catalyst is normal and that when it is abnormal. When abnormality diagnosis is executed in this manner, diagnosis accuracy can be improved.

According to embodiments of the present disclosure, when abnormality diagnosis of an exhaust gas cleaning catalyst having a low temperature is executed, accuracy of the abnormality diagnosis can be improved.

BRIEF DESCRIPTION OF THE DRAWINGS

Features of exemplary embodiments of the present disclosure will be described below with reference to the accompanying drawings, in which like numerals denote like elements, and wherein.

DETAILED DESCRIPTION OF EMBODIMENTS

Hereinafter, with reference to accompanying drawings, a mode for carrying out the present disclosure will be described in detail in accordance with embodiments, for example. While there are described size, material, and shape of each of components, their relative placement, and the like in the embodiments, the scope of the present disclosure is not intended to be limited to them unless otherwise specified.

Figure 1:
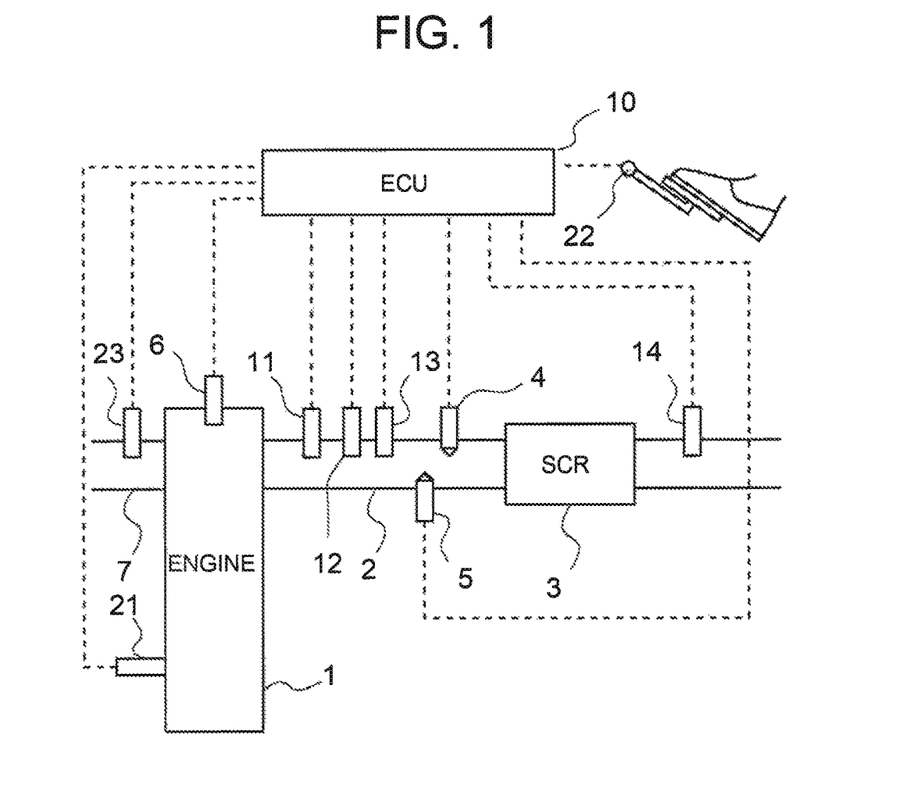
FIG. 1 illustrates a schematic configuration of an internal combustion engine according to a first embodiment and an intake system and an exhaust system thereof.

FIG. 1 illustrates a schematic configuration of an internal combustion engine according to the present embodiment and an intake system and an exhaust system thereof. An internal combustion engine 1 may be a diesel engine for driving a vehicle. The internal combustion engine 1 alternatively may be a gasoline engine. The internal combustion engine 1 is connected to an exhaust passage 2. The exhaust passage 2 is provided with a selective reduction type NOx catalyst 3 (hereinafter referred to as an "SCR catalyst 3") that selectively reduces NOx in exhaust gas by using ammonia as a reduction agent. In the present embodiment, the SCR catalyst 3 is an example of an exhaust gas cleaning catalyst in the present disclosure. In other embodiments, other known types of exhaust gas cleaning catalysts may be used.

The exhaust passage 2 upstream of the SCR catalyst 3 is provided with a urea addition valve 4 that adds urea water, which is a precursor of ammonia, into exhaust gas. The urea water added from the urea addition valve 4 is hydrolyzed to form ammonia that is to be adsorbed to the SCR catalyst 3. The ammonia is used in the SCR catalyst 3 as a reduction agent. Instead of the urea addition valve 4, an ammonia addition valve that adds ammonia into exhaust gas may be provided. Urea addition valve 4 is an example of an additives-supply device in accordance with the present disclosure. The additives-supply device may include one or more of a valve, an injector, and any other known device for supplying additives into the exhaust passage 2.

In addition, the exhaust passage 2 upstream of the SCR catalyst 3 is provided with a hydrogen addition valve 5 that adds hydrogen (H2) into exhaust gas. For example, it is known that when hydrogen is added into various Ag-system catalysts using $Al_2O_3$ and MFI zeolite as carriers, reduction efficiency of NO is improved. Hydrogen can be generated by modifying fuel of the internal combustion engine 1, for example. A well-known art is available for modification of fuel. In the present embodiment, the hydrogen addition valve 5 is an example of an additives supply device in the present disclosure. In other embodiments, other known additives supply devices may be used.

The exhaust passage 2 upstream of the urea addition valve 4 and the hydrogen addition valve 5 is provided with an upstream-side NOx sensor 11 that detects NOx concentration of exhaust gas flowing into the SCR catalyst 3, an air-fuel ratio sensor 12 that detects an air-fuel ratio of exhaust gas flowing into the SCR catalyst 3, and a temperature sensor 13 that detects temperature of exhaust gas flowing into the SCR catalyst 3. The exhaust passage 2 downstream of the SCR catalyst 3 is provided with a downstream-side NOx sensor 14 that detects NOx concentration of exhaust gas flowing out from the SCR catalyst 3.

The internal combustion engine 1 includes fuel injection valves 6 for injecting fuel into the corresponding cylinders. The internal combustion engine 1 is also connected to an air intake passage 7. The air intake passage 7 is provided with an air flow meter 23 that detects the amount of intake air flowing into the internal combustion engine 1.

The internal combustion engine 1 includes an electronic control unit (ECU) 10. The ECU 10 controls the internal combustion engine 1, an exhaust gas cleaning device, and other devices associated with the internal combustion engine 1. The ECU 10 may be configured as a microprocessor that has a central processing unit (CPU) as a central component, and may include, in addition to the CPU, a read-only memory (ROM) that stores a processing program, a random-access memory (RAM) that temporarily stores data, input/output ports, and a communication port. The ECU 10 may be programmed to perform one or more of the functions described herein. The ECU 10 may also receive signals from various sensors that are required for operation control of the internal combustion engine 1 via the input ports. In the present embodiment, the ECU 10 is electrically connected to a crank position sensor 21 and an accelerator operation amount sensor 22 along with the above-described upstream-side NOx sensor 11, air-fuel ratio sensor 12, temperature sensor 13, downstream-side NOx sensor 14, and air flow meter 23. An output value of each sensor is transmitted to the ECU 10.

The ECU 10 is capable of processing operating conditions of the internal combustion engine 1, such as engine rotational speed based on detection of the crank position sensor 21, and engine load based on detection of the accelerator operation amount sensor 22. In the present embodiment, while the upstream-side NOx sensor 11 can detect NOx in exhaust gas flowing into the SCR catalyst 3, NOx contained in exhaust gas discharged from the internal combustion engine 1 (exhaust gas before being cleaned by the SCR catalyst 3, or exhaust gas flowing into the SCR catalyst 3)

also can be estimated on the basis of the above operating conditions of the internal combustion engine 1 because the operating conditions are relevant to the NOx. The ECU 10 is also capable of estimating temperature of the SCR catalyst 3 on the basis of temperature of exhaust gas, detected by the temperature sensor 13. The temperature sensor 13 may detect a temperature of the SCR catalyst 3 instead of temperature of exhaust gas. In the present embodiment, the temperature sensor 13 is an example of a temperature detector of the present disclosure. In other embodiments, other known temperature detectors may be used. In addition, the ECU 10 is capable of calculating a flow rate of exhaust gas on the basis of a detection value of the air flow meter 23 and the amount of fuel injected from the fuel injection valve 6. The ECU 10 is connected to the urea addition valve 4 and the fuel injection valve 6, for example, through electric wiring, and thus, the ECU 10 controls the urea addition valve 4 and the fuel injection valve 6.

The ECU 10 causes the SCR catalyst 3 to preliminarily adsorb ammonia within a range not exceeding the amount of saturated adsorption, and when ammonia adsorbed in the SCR catalyst 3 is reduced due to reduction of NOx, for example, the ECU 10 causes the supply of urea water suitable for the amount of ammonia to be reduced. At the time, the ECU 10 causes the urea addition valve 4 to add urea water into the SCR catalyst 3, such that the amount of ammonia adsorption becomes a target value of the amount of ammonia adsorption (hereinafter referred to as a target amount of adsorption) in the SCR catalyst 3.

When the SCR catalyst 3 has a temperature equal to or less than a first predetermined temperature, the ECU 10 causes the hydrogen addition valve 5 to add hydrogen into the SCR catalyst 3 to execute assist treatment. The first predetermined temperature is an upper limit of a temperature causing a difference in cleaning ability of the SCR catalyst 3 in accordance with the amount of hydrogen supplied to the SCR catalyst 3. The amount of addition of hydrogen in the assist treatment (hereinafter referred to as the amount of assist addition) is determined, such that a NOx removal rate in the SCR catalyst 3 is within an allowable range. When the SCR catalyst 3 has a temperature equal to or less than the first predetermined temperature, a lower temperature can deteriorate a NOx removal rate. Thus, the amount of assist addition is determined based on a temperature of the SCR catalyst 3, such that as a temperature of the SCR catalyst 3 decreases, the amount of assist addition increases. A relationship between a temperature of the SCR catalyst 3 and the amount of assist addition is preliminarily acquired by experiment, simulation, or the like, and stored in the ECU 10. In the present embodiment, the ECU 10 executes the assist treatment to serve as a control device in the present disclosure. In addition, in the present embodiment, the first predetermined temperature corresponds to a predetermined temperature in the present disclosure.

Figure 2:
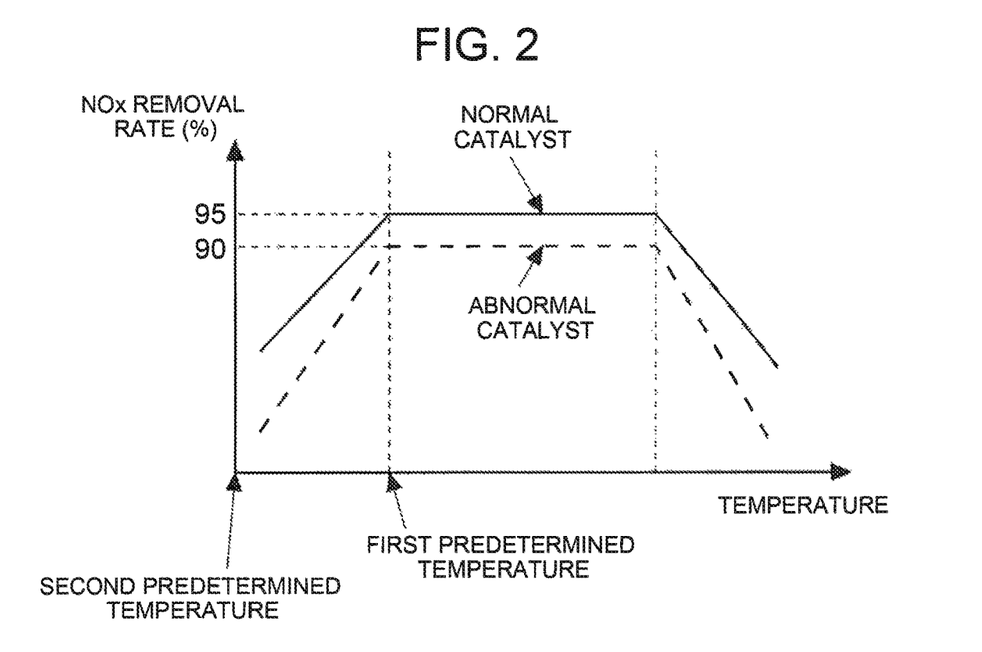
FIG. 2 is a graph showing a relationship between a temperature and an NOx removal rate of an SCR catalyst when assist treatment is not executed.
Figure 3:
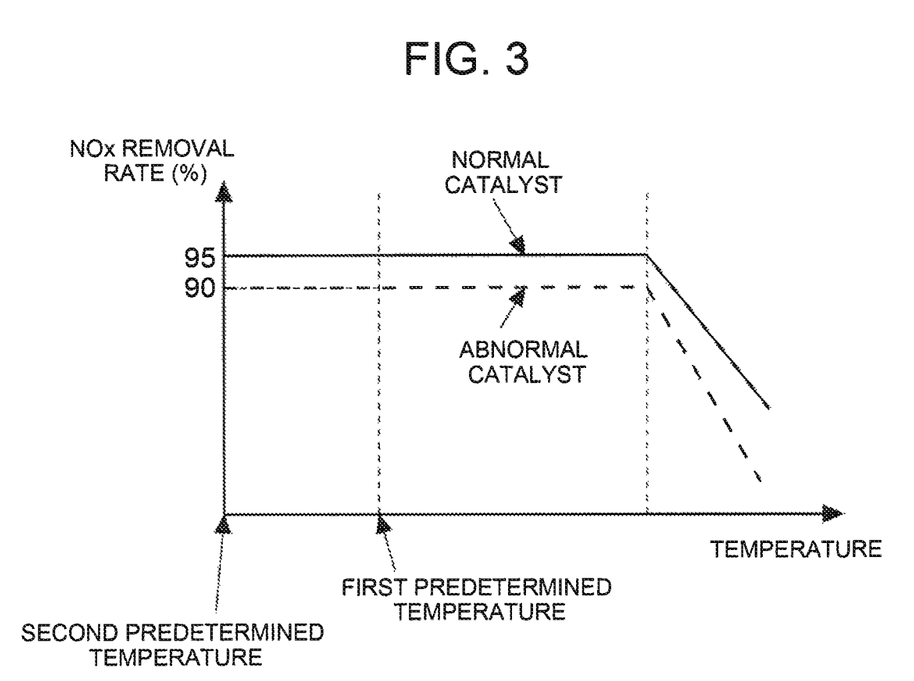
FIG. 3 is a graph showing a relationship between a temperature and an NOx removal rate of an SCR catalyst when assist treatment is executed.

FIG. 2 is a graph showing a relationship between a temperature and a NOx removal rate of the SCR catalyst 3 when assist treatment is not executed. Meanwhile, FIG. 3 is a graph showing a relationship between a temperature and a NOx removal rate of the SCR catalyst 3 when assist treatment is executed. The solid lines each indicate that the SCR catalyst 3 is in a normal state (in a case of a normal catalyst), and the broken lines each indicate that the SCR catalyst 3 is in an abnormal state (in a case of an abnormal catalyst).

As shown in FIG. 2, when assist treatment is not executed and the SCR catalyst 3 has a temperature equal to or less than the first predetermined temperature, a lower temperature of the SCR catalyst 3 reduces a NOx removal rate in each of the normal catalyst and the abnormal catalyst. In this temperature range, the NOx removal rate may decrease below an allowable range when assist treatment is not executed. Meanwhile, as shown in FIG. 3, even when the SCR catalyst 3 has a temperature equal to or less than the first predetermined temperature, executing the assist treatment increases the NOx removal rate in each of the normal catalyst and the abnormal catalyst. As described above, the assist treatment according to the present embodiment can have a large effect when being applied to the SCR catalyst 3 having a low temperature. Thus, the assist treatment according to the present embodiment is executed when the SCR catalyst 3 has a temperature equal to or less than the first predetermined temperature. The first predetermined temperature also can be referred to as an upper limit of a temperature causing change in difference between a NOx removal rate of a normal catalyst and a NOx removal rate of an abnormal catalyst, when it is assumed that the assist treatment is not executed.

The ECU 10 executes abnormality diagnosis of the SCR catalyst 3 on the basis of a NOx removal rate of the SCR catalyst 3. The NOx removal rate is a ratio of the amount of NOx cleaned in the SCR catalyst 3 to the amount of NOx flowing into the SCR catalyst 3. When it is assumed that a flow rate of exhaust gas on each of the upstream and downstream sides of the SCR catalyst 3 is equal, the NOx removal rate may be a ratio of NOx concentration of exhaust gas reduced in the SCR catalyst 3 by being cleaned to NOx concentration of exhaust gas flowing into the SCR catalyst 3. Thus, the NOx removal rate can be calculated by the following expression (1) using detection values of the upstream-side NOx sensor 11 and the downstream-side NOx sensor 14.

NOx removal rate=((detection value of upstream-side NOx sensor 11)−(detection value of downstream-side NOx sensor 14))/(detection value of upstream-side NOx sensor 11) (1)

The ECU 10 diagnoses the SCR catalyst 3 as normal when the NOx removal rate is not less than a diagnosis threshold value, and diagnoses the SCR catalyst 3 as abnormal when the NOx removal rate is less than the diagnosis threshold value. Abnormality diagnosis of the SCR catalyst 3 is executed soon after the internal combustion engine 1 is started. Thus, abnormality diagnosis of the SCR catalyst 3 is executed when the SCR catalyst 3 has a temperature equal to or less than the first predetermined temperature. As described above, an opportunity of being diagnosed as abnormal is increased by executing abnormality diagnosis of the SCR catalyst 3 at a relatively earlier time after the internal combustion engine 1 is started.

Unfortunately, a temperature range of executing assist treatment and a temperature range of executing abnormality diagnosis overlap with each other, so that the assist treatment and the abnormality diagnosis may be executed at the same time. When the assist treatment is executed, a difference between a normal catalyst and an abnormal catalyst in NOx removal rate relatively decreases as shown in FIG. 3, and thus, the normal catalyst and the abnormal catalyst are difficult to be distinguished on the basis of the NOx removal rate. As a result, when abnormality diagnosis of the SCR catalyst 3 is executed, a wrong diagnosis may be provided. In the present embodiment, the amount of assist addition when abnormality diagnosis of the SCR catalyst 3 is executed is reduced to less than when abnormality diagnosis of the SCR catalyst 3 is not executed under the same conditions. Reduction in the amount of assist addition as described above also includes the amount of assist addition reduced to zero, or stop of addition of hydrogen.

When the SCR catalyst 3 has a temperature equal to or less than the first predetermined temperature, a NOx removal rate varies in accordance with the amount of assist addition. That is, the NOx removal rate increases as the amount of assist addition increases, until reaching the NOx removal rate at the first predetermined temperature. Thus, while the amount of assist addition is reduced to deteriorate the NOx removal rate, the amount of deterioration in the NOx removal rate at this time in an abnormal catalyst is more than that in a normal catalyst. That is, when the SCR catalyst 3 has a temperature equal to or less than the first predetermined temperature, reduction in the amount of assist addition enables an increase in a difference between a normal catalyst and an abnormal catalyst in NOx removal rate. This allows a normal catalyst and an abnormal catalyst to be easily distinguished on the basis of the NOx removal rates. Thus, accuracy of abnormality diagnosis can be improved.

When the SCR catalyst 3 has a temperature that is too low, even a normal catalyst can hardly remove NOx. This almost eliminates a difference between a normal catalyst and an abnormal catalyst in NOx removal rate. This may cause a wrong diagnosis in abnormality diagnosis. Thus, abnormality diagnosis of the SCR catalyst 3 is executed at a temperature enabling NOx in exhaust gas to be removed to some extent in a normal catalyst. Then, a lower limit value of the temperature of the SCR catalyst 3, allowing abnormality diagnosis to be executed, is indicated as a second predetermined temperature. That is, in the present embodiment, abnormality diagnosis of the SCR catalyst 3 is executed when the SCR catalyst 3 has a temperature not less than the second predetermined temperature and not more than the first predetermined temperature. The second predetermined temperature is a lower limit value of a temperature causing a difference between a normal catalyst and an abnormal catalyst in the ability for cleaning exhaust gas. The second predetermined temperature may be a lower limit value of a temperature causing a sufficiently large difference between a normal catalyst and an abnormal catalyst in NOx removal rate, or may be a lower limit value of a temperature causing accuracy of abnormality diagnosis to be within an allowable range, for example. In the present embodiment, the second predetermined temperature corresponds to a lower limit temperature in the present disclosure.

As shown in FIG. 2, when the amount of assist addition is reduced, a difference between a normal catalyst and an abnormal catalyst in NOx removal rate increases with a decrease in temperature until an NOx removal rate of an abnormal catalyst becomes zero, in a temperature range equal to or less than the first predetermined temperature. Thus, the second predetermined temperature may be a temperature causing an NOx removal rate of an abnormal catalyst to be substantially zero, or may be near the temperature, for example. When the amount of assist addition is reduced, a difference in NOx removal rate increases more when abnormality diagnosis is executed at a temperature near the second predetermined temperature than when abnormality diagnosis is executed at a temperature near the first predetermined temperature, thereby achieving high accuracy of abnormality diagnosis. Thus, abnormality diagnosis may be executed at a temperature closer to the second predetermined temperature than to the first predetermined temperature. A range of temperature at which abnormality diagnosis is executed may be changed to be suitable for required accuracy of abnormality diagnosis.

Figure 4:
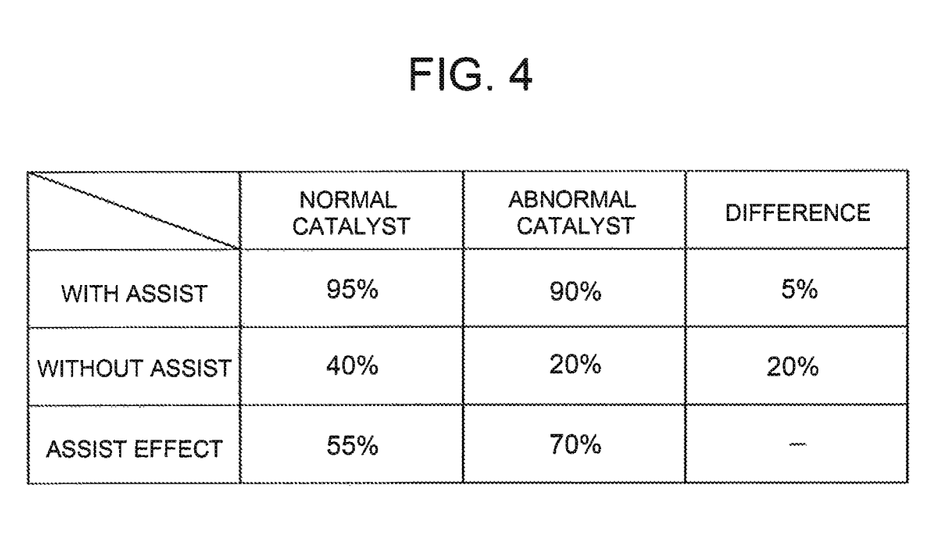
FIG. 4 is a table showing NOx removal rates of a normal catalyst and an abnormal catalyst when assist treatment is executed and when it is not executed.

FIG. 4 is a table showing NOx removal rates of a normal catalyst and an abnormal catalyst when assist treatment is executed and is not executed. FIG. 4 shows a NOx removal rate of the SCR catalyst 3 having a temperature of 200° C., for example. The temperature of 200° C. is not less than the second predetermined temperature and not more than the first predetermined temperature. When assist treatment is executed ("with assist" in FIG. 4), a NOx removal rate of a normal catalyst is 95%, for example, and a NOx removal rate of an abnormal catalyst is 90%, for example. Thus, a difference between the normal catalyst and the abnormal catalyst in NOx removal rate is 5%. Meanwhile, when the assist treatment is not executed ("without assist" in FIG. 4), a NOx removal rate of a normal catalyst is 40%, for example, and a NOx removal rate of an abnormal catalyst is 20%, for example. Thus, when the assist treatment is executed, a NOx removal rate is increased by 55% in an normal catalyst, for example, and a NOx removal rate is increased by 70% in an abnormal catalyst. As described above, the assist treatment provides a larger effect to the abnormal catalyst than to the normal catalyst. When the assist treatment is not executed, a difference between a normal catalyst and an abnormal catalyst in NOx removal rate is 20%, for example, and thus is larger than the difference (5%) in NOx removal rate when the assist treatment is executed. As described above, when abnormality diagnosis is executed in a state with a large difference between a normal catalyst and an abnormal catalyst in NOx removal rate, accuracy of the abnormality diagnosis can be improved.

Figure 5:
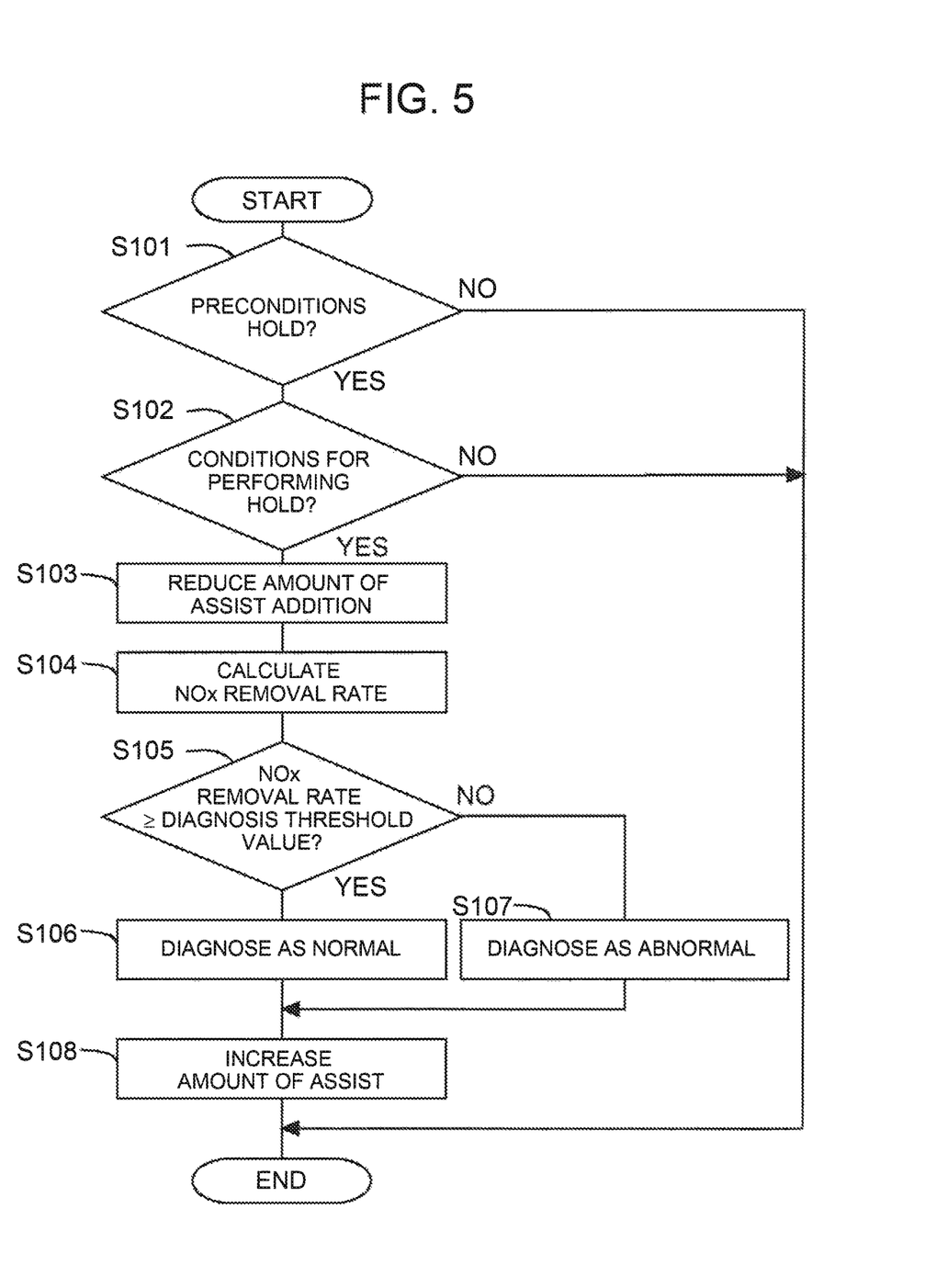
FIG. 5 is a flowchart illustrating a flow of abnormality diagnosis of an SCR catalyst according to the first embodiment.

FIG. 5 is a flowchart illustrating a flow of abnormality diagnosis of the SCR catalyst 3 according to the present embodiment. This flowchart is executed by the ECU 10 for each predetermined time. The ECU 10 separately executes the assist treatment from the time of starting the internal combustion engine 1 until temperature of the SCR catalyst 3 reaches the first predetermined temperature.

In step S101, it is determined whether preconditions for executing abnormality diagnosis hold. For example, the preconditions according to step S101 are as follows: the upstream-side NOx sensor 11 and the downstream-side NOx sensor 14 are normal; and abnormality diagnosis of the SCR catalyst 3 is not executed after the internal combustion engine 1 is started. In the present embodiment, abnormality diagnosis of the SCR catalyst 3 is to be executed only once when the internal combustion engine 1 is operated. It is possible to determine whether the upstream-side NOx sensor 11 and the downstream-side NOx sensor 14 are normal by using methods well-known in the art. When there is a positive determination in step S101, processing proceeds to step S102. Meanwhile, when there is a negative determination in step S101, the present flowchart is finished.

In step S102, it is determined whether conditions for executing abnormality diagnosis hold. The conditions for executing the abnormality diagnosis are as follows: the SCR catalyst 3 has a temperature not less than the second predetermined temperature and not more than the first predetermined temperature; and the internal combustion engine 1 is in steady operation, for example. The conditions for executing the abnormality diagnosis may further include the following: the SCR catalyst 3 has a temperature closer to the second predetermined temperature than to the first predetermined temperature. When there is a positive determination in step S102, processing proceeds to step S103. Alternatively, when there is a negative determination in step S102, the present flowchart is finished.

In step S103, the amount of assist addition is reduced. The amount of reduction at this time is preliminarily acquired by experiment, simulation, or the like, such that a normal catalyst has a NOx removal rate equal to or more than a diagnosis threshold value, and such that an abnormal catalyst has a NOx removal rate less than the diagnosis threshold value, and the amount is stored in the ECU 10. In step S103, the amount of assist addition may be reduced to zero. When processing in step S103 is finished, the processing proceeds to step S104.

In step S104, a NOx removal rate of the SCR catalyst 3 is calculated. The NOx removal rate is calculated by using a detection value of the upstream-side NOx sensor 11 and a detection value of the downstream-side NOx sensor 14 after the processing in step S103 is finished. When processing in step S104 is finished, the processing proceeds to step S105.

In step S105, it is determined whether a NOx removal rate of the SCR catalyst 3 is equal to or more than a diagnosis threshold value. The diagnosis threshold value is a NOx removal rate when it is assumed that the SCR catalyst 3 is between a normal catalyst and an abnormal catalyst, and the diagnosis threshold value is set in accordance with a temperature of the SCR catalyst 3. A relationship between a temperature of the SCR catalyst 3 and a diagnosis threshold value is preliminarily acquired by experiment, simulation, or the like, and the relationship data is stored in the ECU 10. When there is a positive determination in step S105, processing proceeds to step S106, and the SCR catalyst 3 is diagnosed as normal. Alternatively, when there is a negative determination in step S105, processing proceeds to step S107, and the SCR catalyst 3 is diagnosed as abnormal.

When processing in step S106 or S107 is finished, the processing proceeds to step S108. In step S108, the amount of assist addition is returned to the value before reduction in step S103. When the assist treatment is stopped in step S103, the assist treatment is restarted in step S108. When processing in step S108 is finished, the present flowchart is finished. When processing in step S108 is finished, the present flowchart is not executed during a period until the internal combustion engine 1 is started next. The present flowchart may be executed multiple times.

Figure 6:
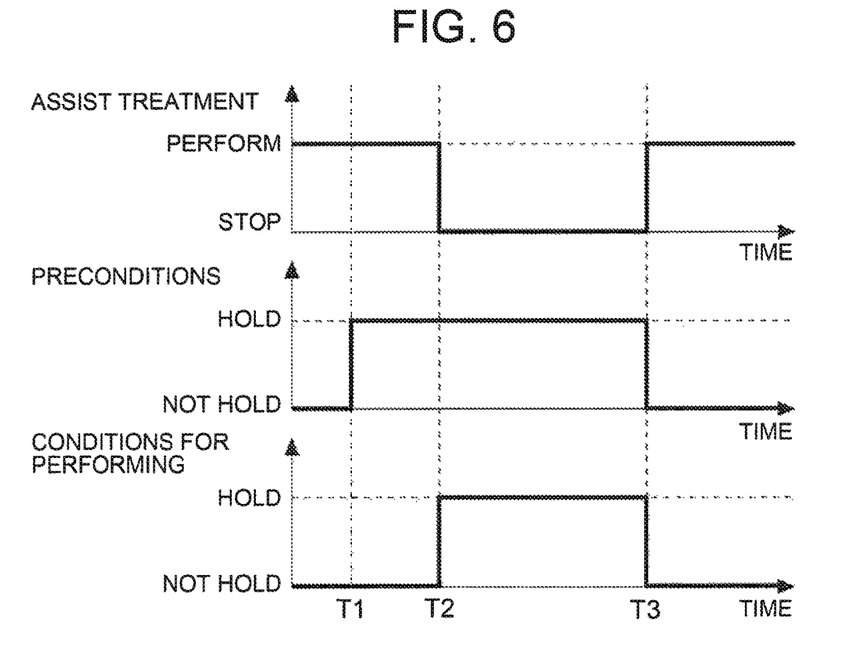
FIG. 6 is a time chart illustrating various states when abnormality diagnosis according to the first embodiment is executed.

FIG. 6 is a time chart illustrating various states when abnormality diagnosis according to the present embodiment is executed. In descending order, a state of assist treatment, a state of preconditions for executing abnormality diagnosis according to step S101, and a state of conditions for executing abnormality diagnosis according to step S102 are illustrated. FIG. 6 illustrates a case where assist treatment is stopped during abnormality diagnosis.

The assist treatment is executed prior to a time indicated by T1. At the time indicated by T1, the preconditions for executing abnormality diagnosis (refer to step S101) hold. However, at the time indicated by T1, the conditions for executing the abnormality diagnosis (refer to step S102) do not hold. Thus, the abnormality diagnosis cannot be executed, so that a state where the assist treatment is being executed is maintained at T1. Then, at a time indicated by T2, the conditions for executing the abnormality diagnosis hold. The assist treatment is executed during a period of time from T1 to T2, so that the cleaning ability of the SCR catalyst 3 is maintained while being high. During a period of time from T2 to T3, both of the preconditions for executing the abnormality diagnosis and the conditions for executing the abnormality diagnosis hold, so that the assist treatment is stopped. Then, during the period of time from T2 to T3, the abnormality diagnosis is executed. The assist treatment is stopped during the period, so that the cleaning ability of the SCR catalyst 3 deteriorates. In addition, a difference between a normal catalyst and an abnormal catalyst in NOx removal rate increases. When the abnormality diagnosis is finished at the time indicated by T3, the assist treatment is restarted. As described above, the assist treatment is started immediately after the abnormality diagnosis is finished, so that the NOx cleaning ability of the SCR catalyst 3 is rapidly increased. This enables a period of time of deteriorating a NOx removal rate to be prevented from lengthening more than necessary.

While the assist treatment is executed by supplying hydrogen to the SCR catalyst 3 in the present embodiment, the assist treatment may be executed by supplying ozone in place of hydrogen.

As described above, according to the present embodiment, even when abnormality diagnosis is applied to the SCR catalyst 3 having a low temperature, diagnosis accuracy can be improved by reducing the amount of assist addition.

Figure 7:
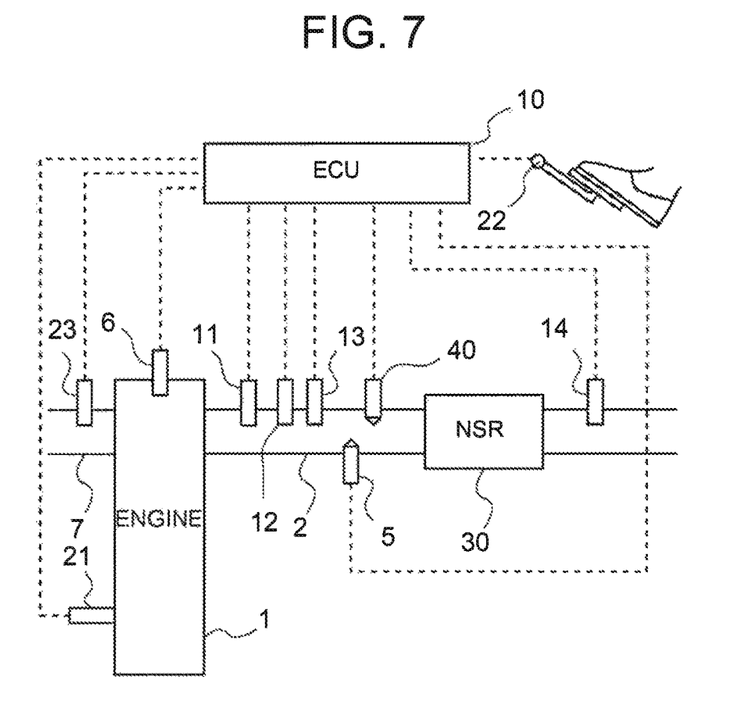
FIG. 7 illustrates a schematic configuration of an internal combustion engine according to a second embodiment and an intake system and an exhaust system thereof.

While assist treatment is applied to the SCR catalyst 3 in the first embodiment, assist treatment is applied to a storage reduction type NOx catalyst (hereinafter referred to as an NSR catalyst) in a second embodiment. FIG. 7 illustrates a schematic configuration of an internal combustion engine according to the second embodiment and an intake system and an exhaust system thereof. The differences between FIG. 1 and FIG. 7 will be mainly described. An internal combustion engine 1 includes an exhaust passage 2 that is provided with an NSR catalyst 30. When an air-fuel ratio of exhaust gas flowing into the NSR catalyst 30 is an air-fuel ratio more than a theoretical air-fuel ratio (hereinafter referred to as a lean air-fuel ratio), the NSR catalyst 30 stores NOx in the exhaust gas. When an air-fuel ratio of exhaust gas flowing into the NSR catalyst 30 is an air-fuel ratio less than a theoretical air-fuel ratio (hereinafter referred to as a rich air-fuel ratio), the NSR catalyst 30 discharges and reduces NOx. The term, "store" is used as a term including temporary adsorption of NOx. In the present embodiment, the NSR catalyst 30 corresponds to an exhaust gas cleaning catalyst in the present disclosure.

When the internal combustion engine 1 is operated at a rich air-fuel ratio, an air-fuel ratio of exhaust gas flowing into the NSR catalyst 30 becomes a rich air-fuel ratio and unburnt fuel (HC, CO) serving as a reduction agent is supplied to the NSR catalyst 30. As illustrated in FIG. 7, a fuel addition valve 40 for adding fuel (HC) into the internal combustion engine 1 may be provided in the exhaust passage 2 upstream of the NSR catalyst 30 so that fuel serving as a reduction agent may be supplied to the NSR catalyst 30 by adding fuel into the exhaust gas through the fuel addition valve 40 while an air-fuel ratio of exhaust gas flowing into the NSR catalyst 30 is set to a rich air-fuel ratio. Fuel addition valve 40 is an example of an additives-supply device in accordance with the present disclosure. The additives-supply device may include one or more of a valve, an injector, and any other known device for supplying additives into the exhaust passage 2. The fuel addition valve 40 is connected to an ECU 10, for example, through electric wiring, so that the fuel addition valve 40 is controlled by the ECU 10. Hereinafter, the following supply is also referred to as fuel supply to the NSR catalyst 30: supply of unburnt fuel to the NSR catalyst 30 by operating the internal combustion engine 1 at a rich air-fuel ratio; and supply of fuel to the NSR catalyst 30 through the fuel addition valve 40.

In the present embodiment, when a NOx storage amount of the NSR catalyst 30 becomes a predetermined storage amount, NOx stored in the NSR catalyst 30 is reduced. The NOx storage amount in the NSR catalyst 30 is calculated by integrating a value acquired by subtracting the amount of NOx flowing out from the NSR catalyst 30 and the amount of NOx reduced in the NSR catalyst 30 from the amount of NOx flowing into the NSR catalyst 30, for example. The ECU 10 calculates a NOx storage amount of the NSR catalyst 30 as needed on the basis of a detection value of each of an upstream-side NOx sensor 11, a temperature sensor 13, a downstream-side NOx sensor 14, and an air flow meter 23, and an air-fuel ratio of exhaust gas. The NOx storage amount of the NSR catalyst 30 may be calculated by any well-known method.

The ECU 10 executes fuel supply to the NSR catalyst 30 so as to reduce NOx of the predetermined storage amount. Thus, the ECU 10 executes the fuel supply to the NSR catalyst 30 such that the amount of a reduction agent suitable for a NOx storage amount of the NSR catalyst 30 is supplied to the NSR catalyst 30.

On the other hand, when NOx stored in the NSR catalyst 30 having a temperature equal to or less than a third predetermined temperature is reduced, the ECU 10 causes hydrogen to be added to the NSR catalyst 30 through a hydrogen addition valve 5 instead of supplying fuel thereto. That is, hydrogen is supplied as a reduction agent in place of HC and CO to reduce NOx. As described above, assist treatment is executed by adding hydrogen through the hydrogen addition valve 5. The third predetermined temperature is an upper limit of a temperature causing an ability for cleaning exhaust gas of the NSR catalyst 30 to be improved by supplying hydrogen. Hereinafter, the following supply is also referred to as hydrogen supply to the NSR catalyst 30: supply of hydrogen to the NSR catalyst 30 through the hydrogen addition valve 5. The ECU 10 executes hydrogen supply to the NSR catalyst 30 such that the amount of a reduction agent suitable for a NOx storage amount of the NSR catalyst 30 is supplied to the NSR catalyst 30. In the present embodiment, the third predetermined temperature corresponds to a predetermined temperature in the present disclosure.

Hydrogen has a higher reducing power than that of each HC and CO, so that reduction ability of the NSR catalyst 30 is improved more by executing the hydrogen supply to the NSR catalyst 30 than by executing the fuel supply to the NSR catalyst 30. Thus, when the NSR catalyst 30 has a low activity due to a low temperature, reduction of NOx can be accelerated by executing the hydrogen supply to the NSR catalyst 30. On the other hand, when the NSR catalyst 30 has a sufficiently high temperature, NOx can be reduced by the fuel supply to the NSR catalyst 30. Thus, the amount of energy consumption to generate hydrogen can be reduced by executing the fuel supply to the NSR catalyst 30.

Figure 8:
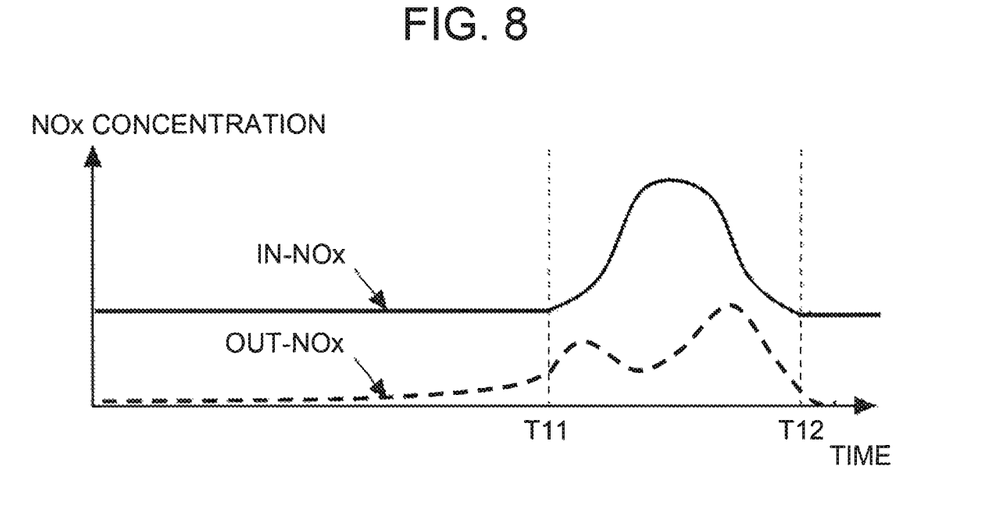
FIG. 8 is a time chart illustrating transition of NOx concentration (in-NOx) of exhaust gas flowing into an NSR catalyst and NOx concentration (out-NOx) of exhaust gas flowing out from the NSR catalyst when assist treatment is not executed.
Figure 9:
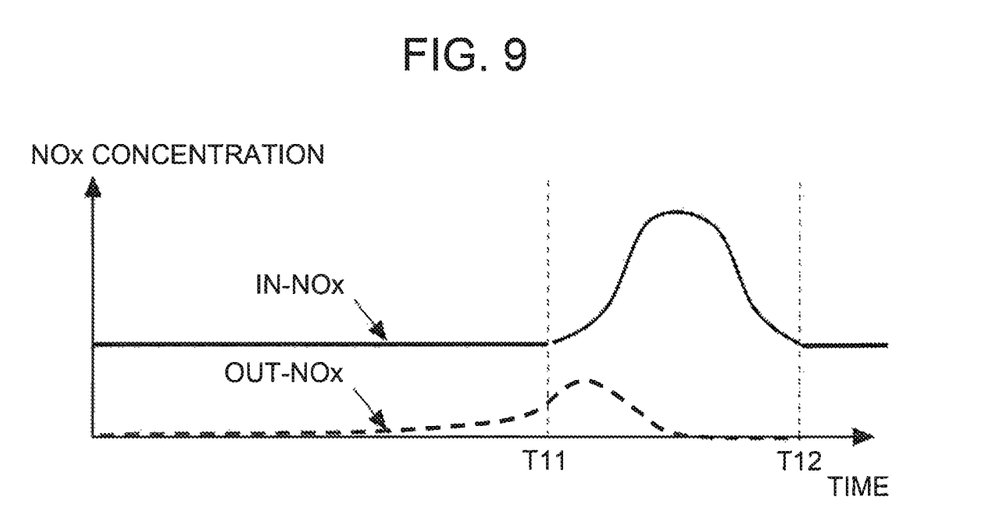
FIG. 9 is a time chart illustrating transition of NOx concentration (in-NOx) of exhaust gas flowing into an NSR catalyst and NOx concentration (out-NOx) of exhaust gas flowing out from the NSR catalyst when assist treatment is executed.

FIG. 8 is a time chart illustrating transition of NOx concentration (in-NOx) of exhaust gas flowing into the NSR catalyst 30 and NOx concentration (out-NOx) exhaust gas flowing out from the NSR catalyst 30 when assist treatment is not executed. FIG. 8 is a time chart for reducing NOx by the fuel supply to the NSR catalyst 30 when the NSR catalyst 30 has a temperature equal to or less than the third predetermined temperature. FIG. 9 is a time chart illustrating transition of NOx concentration (in-NOx) of exhaust gas flowing into the NSR catalyst 30 and NOx concentration (out-NOx) exhaust gas flowing out from the NSR catalyst 30 when assist treatment is executed. FIG. 9 is a time chart for reducing NOx by the hydrogen supply to the NSR catalyst 30 when the NSR catalyst 30 has a temperature equal to or less than the third predetermined temperature. In FIGS. 8 and 9, T11 is a time when a NOx storage amount of the NSR catalyst 30 reaches a predetermined storage amount, and is a time when the fuel supply to the NSR catalyst 30 or the hydrogen supply to the NSR catalyst 30 starts to reduce NOx. In addition, T2 is a time when the fuel supply to the NSR catalyst 30 or the hydrogen supply to the NSR catalyst 30 is finished. In-NOx is changed depending on operating conditions of the internal combustion engine 1.

As can be seen by comparing FIGS. 8 and 9 with each other, during a period of time from T11 to T12, a NOx concentration of exhaust gas flowing out from the NSR catalyst 30 when the hydrogen supply to the NSR catalyst 30 is executed is lower than that when the fuel supply to the NSR catalyst 30 is executed. Thus, when the NSR catalyst 30 has a low temperature, a NOx concentration of exhaust gas flowing out from the NSR catalyst 30 decreases to less than an NOx concentration of exhaust gas flowing into the NSR catalyst 30 by executing assist treatment. When a NOx removal rate is calculated according to expression (1) described above, a NOx removal rate of the NSR catalyst 30 is increased by executing assist treatment.

Figure 10:
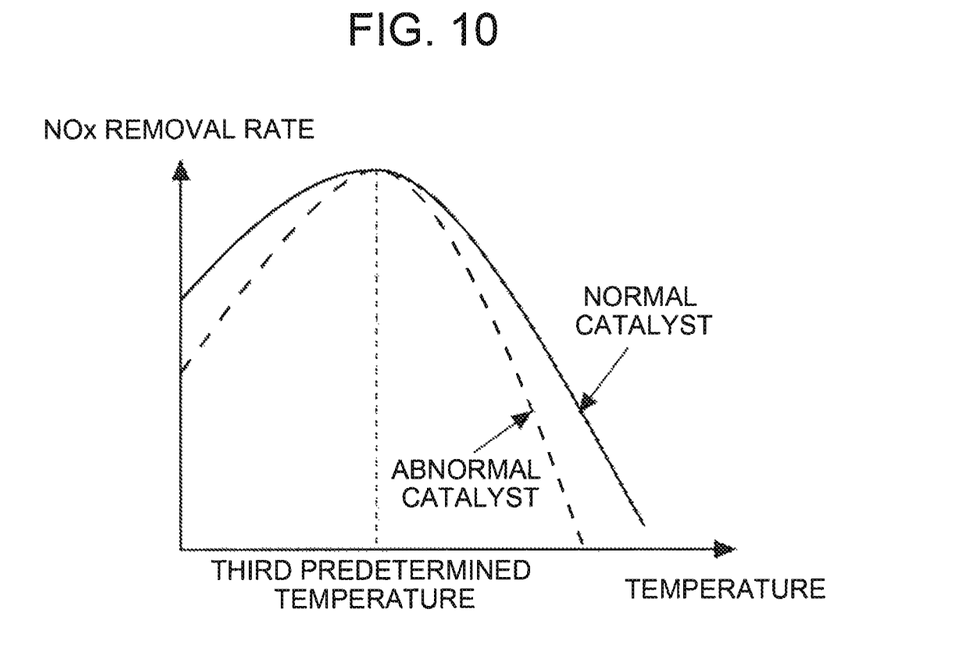
FIG. 10 is a graph showing a relationship between a temperature and an NOx removal rate at the time of reduction of NOx of an NSR catalyst when assist treatment is not executed.
Figure 11:
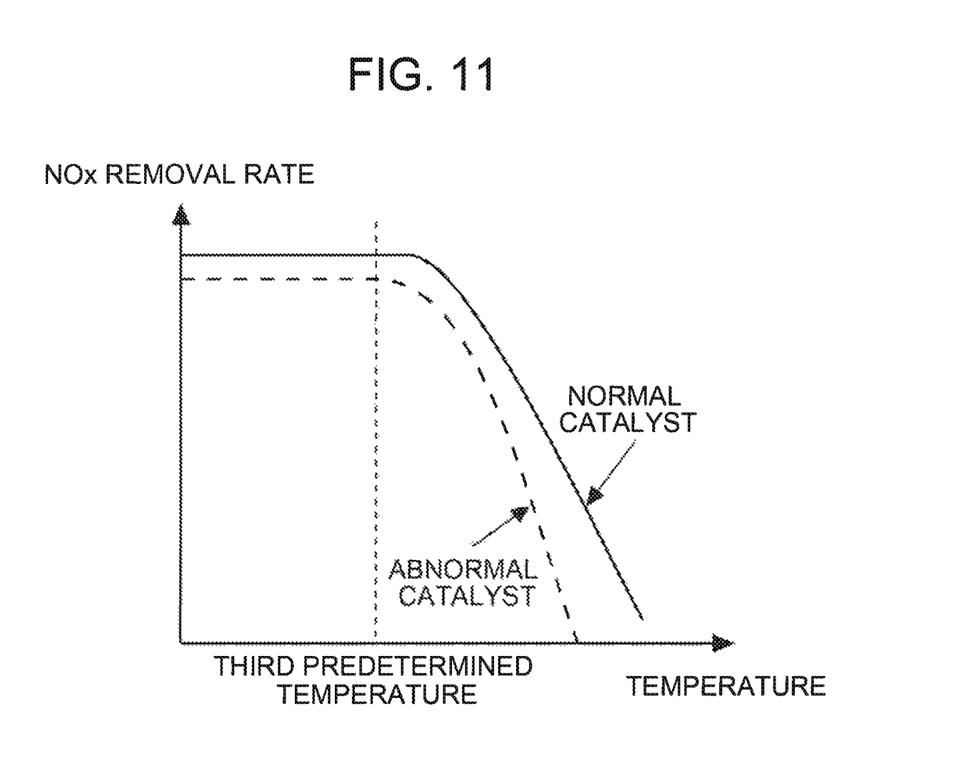
FIG. 11 is a graph showing a relationship between a temperature and an NOx removal rate at the time of reduction of NOx of an NSR catalyst when assist treatment is executed.

FIG. 10 is a graph showing a relationship between a temperature of the NSR catalyst 30 and a NOx removal rate at the time of reduction of NOx when assist treatment is not executed. FIG. 11 is a graph showing a relationship between a temperature of the NSR catalyst 30 and a NOx removal rate at the time of reduction of NOx when assist treatment is executed. The solid lines each indicate that the NSR catalyst 30 is in a normal state, and the broken lines each indicate that the NSR catalyst 30 is in an abnormal state.

As shown in FIG. 10, when assist treatment is not executed and the NSR catalyst 30 has a temperature equal to or less than the third predetermined temperature, a lower temperature of the NSR catalyst 30 greatly reduces a NOx removal rate in each of the normal catalyst and the abnormal catalyst. Alternatively, as shown in FIG. 11, even when the NSR catalyst 30 has a temperature equal to or less than the first predetermined temperature, executing the assist treatment increases the NOx removal rate in each of the normal catalyst and the abnormal catalyst. As described above, the assist treatment according to the present embodiment causes an effect when being applied to the NSR catalyst 30 having a temperature equal to or less than the third predetermined temperature. Thus, the assist treatment according to the present embodiment is executed when the NSR catalyst 30 has a temperature equal to or less than the third predetermined temperature. The third predetermined temperature also can be referred to as an upper limit of a temperature causing a difference between a normal catalyst and an abnormal catalyst in NOx removal rate to decrease with increase in temperature of the NSR catalyst 30, when it is assumed that the assist treatment is not executed.

The ECU 10 executes abnormality diagnosis of the NSR catalyst 30 on the basis of the NOx reduction ability of the NSR catalyst 30, or the ability for cleaning exhaust gas. The NOx reduction ability of the NSR catalyst 30 is associated with a NOx removal rate when a reduction agent is supplied to the NSR catalyst 30 to reduce NOx stored in the NSR catalyst 30. The ECU 10 calculates a NOx removal rate on the basis of a detection value of each of the upstream-side NOx sensor 11 and the downstream-side NOx sensor 14 when NOx stored in the NSR catalyst 30 is reduced. Then, the ECU 10 diagnoses the NSR catalyst 30 as normal when the NOx removal rate is a diagnosis threshold value or more, and diagnoses the NSR catalyst 30 as abnormal when the NOx removal rate is less than the diagnosis threshold value. Also in the present embodiment, an opportunity of being diagnosed as abnormal is increased by executing abnormality diagnosis of the NSR catalyst 30 relatively early after the internal combustion engine 1 is started. Thus, abnormality diagnosis of the NSR catalyst 30 is executed when the NSR catalyst 30 has a temperature equal to or less than the third predetermined temperature.

Unfortunately, when the NSR catalyst 30 has a temperature equal to or less than the third predetermined temperature, assist treatment is executed. When the assist treatment is executed, a difference between a normal catalyst and an abnormal catalyst in NOx removal rate becomes relatively small, and thus a wrong diagnosis may be provided when abnormality diagnosis of the NSR catalyst 30 is executed. Thus, in the present embodiment, when abnormality diagnosis of the NSR catalyst 30 is executed, assist treatment is stopped. The amount of assist addition may be reduced to zero. At this time, the hydrogen supply to the NSR catalyst 30 may be switched to the fuel supply to the NSR catalyst 30. As described above, when abnormality diagnosis of the NSR catalyst 30 is executed, a difference between a normal catalyst and an abnormal catalyst in NOx removal rate is increased by stopping assist treatment, thereby enabling accuracy of the abnormality diagnosis to be improved.

When the NSR catalyst 30 has a temperature that is too low, even a normal catalyst can hardly remove NOx. This almost eliminates a difference between a normal catalyst and an abnormal catalyst in NOx removal rate. When abnormality diagnosis is executed in this state, a wrong diagnosis may be provided. Thus, abnormality diagnosis of the NSR catalyst 30 is executed at a temperature enabling NOx in exhaust gas to be removed to some extent in a normal catalyst. Then, a lower limit value of the temperature of the NSR catalyst 30, allowing abnormality diagnosis to be executed, is indicated as a fourth predetermined temperature. That is, in the present embodiment, abnormality diagnosis of the NSR catalyst 30 is executed when the NSR catalyst 30 has a temperature not less than the fourth predetermined temperature and not more than the third predetermined temperature. The fourth predetermined temperature is a lower limit value of a temperature causing a difference between a normal catalyst and an abnormal catalyst in ability for cleaning exhaust gas. The fourth predetermined temperature may be a lower limit value of a temperature causing a sufficiently large difference between a normal catalyst and an abnormal catalyst in NOx removal rate, or may be a lower limit value of a temperature causing accuracy of abnormality diagnosis to be within an allowable range, for example. In the present embodiment, the fourth predetermined temperature corresponds to a lower limit temperature in the present disclosure.

When assist treatment is not executed, or when the amount of assist addition is set to zero, a difference between a normal catalyst and an abnormal catalyst in NOx removal rate increases with a decrease in temperature until a NOx removal rate of an abnormal catalyst becomes zero, in a temperature range equal to or less than the third predetermined temperature. Thus, the fourth predetermined temperature may be a temperature causing a NOx removal rate of an abnormal catalyst to be substantially zero, or may be substantially close to that temperature, for example. When assist treatment is not executed, a difference in NOx removal rate increases more when abnormality diagnosis is executed at a temperature near the fourth predetermined temperature than when abnormality diagnosis is executed at a temperature near the third predetermined temperature, thereby achieving high accuracy of abnormality diagnosis. Thus, abnormality diagnosis may be executed at a temperature closer to the fourth predetermined temperature than to the third predetermined temperature. A range of temperatures at which abnormality diagnosis is executed may be changed to be suitable for the required accuracy of abnormality diagnosis.

Figure 12:
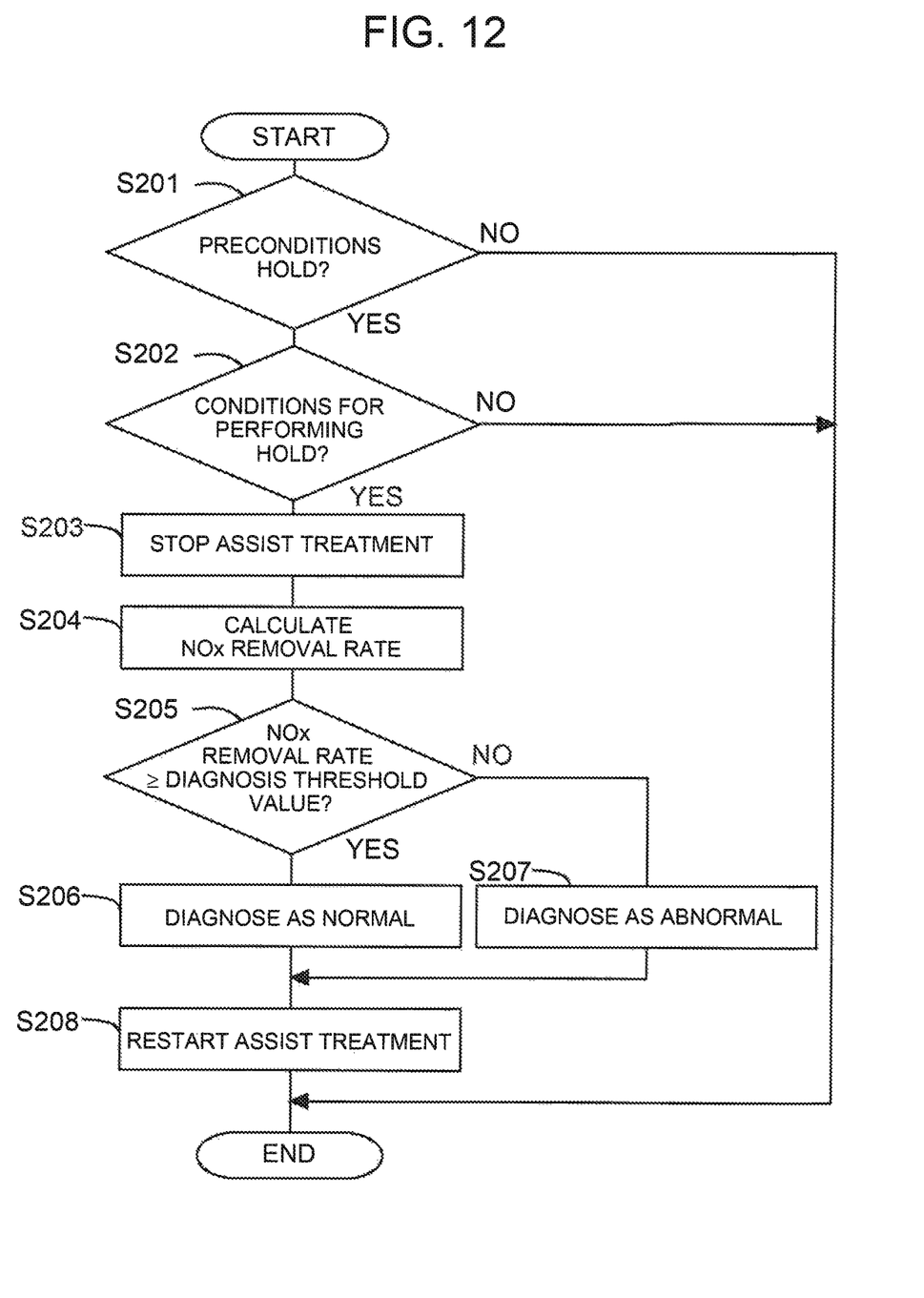
FIG. 12 is a flowchart illustrating a flow of abnormality diagnosis of an NSR catalyst according to the second embodiment.

FIG. 12 is a flowchart illustrating a flow of abnormality diagnosis of the NSR catalyst 30 according to the present embodiment. This flowchart is executed by the ECU 10 for each predetermined time. The ECU 10 separately executes the assist treatment from the time of starting the internal combustion engine 1 until temperature of the NSR catalyst 30 reaches the third predetermined temperature.

In step S201, it is determined whether preconditions for executing abnormality diagnosis hold. For example, the preconditions according to step S201 are as follows: the upstream-side NOx sensor 11 and the downstream-side NOx sensor 14 are normal; and abnormality diagnosis of the NSR catalyst 30 is not executed after the internal combustion engine 1 is started. In the present embodiment, abnormality diagnosis of the NSR catalyst 30 is to be executed only once when the internal combustion engine 1 is operated. It is possible to determine whether the upstream-side NOx sensor 11 and the downstream-side NOx sensor 14 are normal by using methods well-known in the art. When there is a positive determination in step S201, processing proceeds to step S202. Alternatively, when there is a negative determination in step S201, the present flowchart is finished.

In step S202, it is determined whether conditions for executing abnormality diagnosis hold. The conditions for executing the abnormality diagnosis are as follows: the NSR catalyst 30 has a temperature not less than the fourth predetermined temperature and not more than the third predetermined temperature; and the internal combustion engine 1 is in steady operation, for example. The conditions for executing the abnormality diagnosis may further include the following: the NSR catalyst 30 has a temperature closer to the fourth predetermined temperature than to the third predetermined temperature. When there is a positive determination in step S202, processing proceeds to step S203. Alternatively, when there is a negative determination in step S202, the present flowchart is finished.

In step S203, the assist treatment is stopped. At this time, the hydrogen supply to the NSR catalyst 30 is stopped, and the fuel supply to the NSR catalyst 30 is started. In the present embodiment, abnormality diagnosis is executed on the basis of reduction ability of the NSR catalyst 30, so that the fuel supply to the NSR catalyst 30 is executed to reduce NOx even when the hydrogen supply to the NSR catalyst 30 is stopped. When processing in step S203 is finished, the processing proceeds to step S204.

In step S204, a NOx removal rate of the NSR catalyst 30 is calculated. The NOx removal rate is calculated by using a detection value of the upstream-side NOx sensor 11 and a detection value of the downstream-side NOx sensor 14 after the processing in step S203 is finished. When processing in step S204 is finished, the processing proceeds to step S205.

In step S205, it is determined whether an NOx removal rate of the NSR catalyst 30 is equal to or more than a diagnosis threshold value. The diagnosis threshold value is a NOx removal rate when it is assumed that the NSR catalyst 30 is between a normal catalyst and an abnormal catalyst, and the diagnosis threshold value is set in accordance with a temperature of the NSR catalyst 30. A relationship between a temperature of the NSR catalyst 30 and a diagnosis threshold value is preliminarily acquired by experiment, simulation, or the like, and the relationship data is stored in the ECU 10. When there is a positive determination in step S205, processing proceeds to step S206, and the NSR catalyst 30 is diagnosed as normal. Alternatively, when there is a negative determination in step S205, processing proceeds to step S207, and the NSR catalyst 30 is diagnosed as abnormal.

When processing in step S206 or S207 is finished, the processing proceeds to step S208. In step S208, the assist treatment is restarted. That is, the fuel supply to the NSR catalyst 30 is switched to the hydrogen supply to the NSR catalyst 30. When processing in step S208 is finished, the present flowchart is finished. When processing in step S208 is finished, the present flowchart is not executed during a period until the internal combustion engine 1 is started next. The present flowchart may be executed multiple times.

As described above, according to the present embodiment, even when abnormality diagnosis is applied to the NSR catalyst 30 having a low temperature, diagnosis accuracy can be improved by stopping the assist treatment.

It will be apparent to those skilled in the art that various modifications and variations can be made to the disclosed internal combustion engine and method without departing from the scope of the disclosure. Other embodiments of the internal combustion engine and method will be apparent to those skilled in the art from consideration of the specification and practice of the internal combustion engine and method disclosed herein. It is intended that the specification and examples be considered as exemplary only, with a true scope of the disclosure being indicated by the following claims.

What is claimed is:

1. An internal combustion engine comprising:
    an exhaust gas cleaning catalyst provided in an exhaust passage to clean exhaust gas;
    a temperature detector detecting a temperature of the exhaust gas cleaning catalyst;
    an additives-supply device supplying additives to the exhaust gas cleaning catalyst; and
    an electronic control unit configured to cause the additives supply device to supply the additives to the exhaust gas cleaning catalyst when the temperature of the exhaust gas cleaning catalyst, detected by the temperature detector, is not more than a first predetermined temperature,
    wherein:
        the electronic control unit is configured to execute abnormality diagnosis of the exhaust gas cleaning catalyst based on an ability for cleaning exhaust gas of the exhaust gas cleaning catalyst, and
        when executing abnormality diagnosis of the exhaust gas cleaning catalyst, the electronic control unit is configured to:
            determine whether the temperature of the exhaust gas cleaning catalyst is greater than a lower limit temperature, and less than the first predetermined temperature;
            reduce an amount of the additives supplied to the exhaust gas cleaning catalyst to less than an amount of the additives supplied when abnormality diagnosis of the exhaust gas cleaning catalyst having the temperature greater than the lower limit temperature and less than the first predetermined temperature is not executed;
            calculate a NOx removal rate of the exhaust gas cleaning catalyst;
            determine whether the NOx removal rate of the exhaust gas cleaning catalyst is greater than or equal to a threshold value; and
            diagnose the exhaust gas cleaning catalyst is abnormal if the NOx removal rate of the exhaust gas cleaning catalyst is less than the threshold value.

2. The internal combustion engine according to claim 1, wherein
    the electronic control unit is configured to increase an amount of the additives to be supplied to the exhaust gas cleaning catalyst from the time when abnormality diagnosis of the exhaust gas cleaning catalyst is completed, as compared with that when abnormality diagnosis of the exhaust gas cleaning catalyst is executed.

3. The internal combustion engine according to claim 1, wherein
    the electronic control unit is configured to execute abnormality diagnosis of the exhaust gas cleaning catalyst when the exhaust gas cleaning catalyst has a temperature that is the first predetermined temperature or less and is the lower limit temperature or more, and
    the lower limit temperature is a lower limit of a temperature causing a difference between ability for cleaning exhaust gas when the exhaust gas cleaning catalyst is normal and when the exhaust gas cleaning catalyst is abnormal in the exhaust gas cleaning catalyst having the temperature less than the first predetermined temperature.

4. The internal combustion engine according to claim 3, wherein
    the electronic control unit is configured to execute abnormality diagnosis of the exhaust gas cleaning catalyst when the exhaust gas cleaning catalyst has a temperature that is the first predetermined temperature or less and is closer to the lower limit temperature than to the first predetermined temperature.

5. The internal combustion engine according to claim 1, wherein
    the electronic control unit is configured to stop supply of the additives to the exhaust gas cleaning catalyst when abnormality diagnosis of the exhaust gas cleaning catalyst having the temperature not more than the first predetermined temperature is executed.

6. A method for controlling an internal combustion engine, the internal combustion engine including:
    an exhaust gas cleaning catalyst provided in an exhaust passage to clean exhaust gas;
    a temperature detector detecting a temperature of the exhaust gas cleaning catalyst;
    an additives-supply device supplying additives to the exhaust gas cleaning catalyst; and
    an electronic control unit configured to cause the additives supply device to supply the additives to the exhaust gas cleaning catalyst when the temperature of the exhaust gas cleaning catalyst, detected by the temperature detector, is not more than a first predetermined temperature,
    wherein the electronic control unit is configured to execute abnormality diagnosis of the exhaust gas cleaning catalyst based on an ability for cleaning exhaust gas of the exhaust gas cleaning catalyst,
    the method for controlling the internal combustion engine comprising:
        determining whether the temperature of the exhaust gas cleaning catalyst is greater than a lower limit temperature, and less than the first predetermined temperature;
        reducing, by the electronic control unit, an amount of the additives supplied to the exhaust gas cleaning catalyst when abnormality diagnosis of the exhaust gas cleaning catalyst having the temperature greater than the lower limit temperature and less than the first predetermined temperature is executed, to less than an amount of the additives supplied to the exhaust gas cleaning catalyst when abnormality diagnosis of the exhaust gas cleaning catalyst having the temperature greater than the lower limit temperature and less than the first predetermined temperature is not executed;

calculating a NOx removal rate of the exhaust gas cleaning catalyst;

determining whether the NOx removal rate of the exhaust gas cleaning catalyst is greater than or equal to a threshold value; and diagnosing the exhaust gas cleaning catalyst is abnormal if the NOx removal rate of the exhaust gas cleaning catalyst is less than the threshold value.

7. The method according to claim 6, further comprising:

increasing, by the electronic control unit, an amount of the additives to be supplied to the exhaust gas cleaning catalyst from the time when abnormality diagnosis of the exhaust gas cleaning catalyst is completed, as compared with that when abnormality diagnosis of the exhaust gas cleaning catalyst is executed.

8. The method according to claim 6, further comprising executing the abnormality diagnosis of the exhaust gas cleaning catalyst when the exhaust gas cleaning catalyst has a temperature that is the first predetermined temperature or less and is the lower limit temperature or more, wherein:

the lower limit temperature is a lower limit of a temperature causing a difference between the ability for cleaning exhaust gas when the exhaust gas cleaning catalyst is normal and when the exhaust gas cleaning catalyst is abnormal in the exhaust gas cleaning catalyst having the temperature less than the first predetermined temperature.

9. The method according to claim 8, further comprising:

executing the abnormality diagnosis of the exhaust gas cleaning catalyst when the exhaust gas cleaning catalyst has a temperature that is the first predetermined temperature or less and is closer to the lower limit temperature than to the first predetermined temperature.

10. The method according to claim 6, further comprising:

stopping the supply of the additives to the exhaust gas cleaning catalyst when abnormality diagnosis of the exhaust gas cleaning catalyst having the temperature not more than the first predetermined temperature is executed.

* * * * *